US008566555B2

(12) United States Patent
Kobayashi

(10) Patent No.: US 8,566,555 B2
(45) Date of Patent: Oct. 22, 2013

(54) DATA INSERTION SYSTEM, DATA CONTROL DEVICE, STORAGE DEVICE, DATA INSERTION METHOD, DATA CONTROL METHOD, DATA STORING METHOD

(75) Inventor: Dai Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 124 days.

(21) Appl. No.: 13/254,337

(22) PCT Filed: Mar. 9, 2010

(86) PCT No.: PCT/JP2010/001637
§ 371 (c)(1),
(2), (4) Date: Sep. 1, 2011

(87) PCT Pub. No.: WO2010/116608
PCT Pub. Date: Oct. 14, 2010

(65) Prior Publication Data
US 2012/0011338 A1    Jan. 12, 2012

(30) Foreign Application Priority Data

Mar. 30, 2009    (JP) .................................. 2009-083426

(51) Int. Cl.
*G06F 12/02* (2006.01)
(52) U.S. Cl.
USPC .......................................... 711/170; 711/161
(58) Field of Classification Search
None
See application file for complete search history.

(56) References Cited

U.S. PATENT DOCUMENTS 7,870,191 B2 *    1/2011    Hatasaki et al. ............... 709/203
7,895,395 B2 *    2/2011    Ninose .......................... 711/114

FOREIGN PATENT DOCUMENTS

| JP | 2000047831 A | 2/2000 |
| JP | 2004038929 A | 2/2004 |
| JP | 2007164794 A | 6/2007 |
| JP | 2008276596 A | 11/2008 |

OTHER PUBLICATIONS

International Search Report for PCT/JP2010/001637 mailed May 18, 2010.
"SnapshotIQ", Isilon Systems, Inc., <Internet>, http://www.isilon.co.jp/materials/brochures/30480_Snapshot.pdf, 2008.

* cited by examiner

*Primary Examiner* — Gary Portka

(57) ABSTRACT

The data insertion system has a storage system 1, a backup storage 2 and a backup controller 3. The data insertion system has a first distribution index information obtaining unit 311 that obtains first distribution index information concerning arrangement in the storage system 1; a configuration information request unit 312 requests system configuration information indicating a configuration of disk drives 111 to 114 and second distribution index information of the storage system 1 from the storage system 1; a device distribution index information generation unit 1011 that generates the system configuration information and the second distribution index information; and, a new data arrangement information generation unit 314 that generates new data arrangement information on the basis of the generated system configuration information, the generated second distribution index information, and the first distribution index information.

17 Claims, 15 Drawing Sheets

FIG. 3

| BLOCK NUMBER | | DISK DRIVE NUMBER | DATA POSITION IN DISK DRIVE |
|---|---|---|---|
| VOLUME NUMBER | RELATIVE BLOCK NUMBER | | |
| 0 | 0 | 0 | 0 |
| 0 | 1 | 0 | 8 |
| 0 | 2 | 0 | 24 |
| ⋮ | ⋮ | ⋮ | ⋮ |

FIG. 6

| DISK DRIVE NUMBER | DATA POSITION IN DISK DRIVE |
|---|---|
| 113 | 0 |
| 114 | 20 |
| 113 | 24 |
| 112 | 30 |

FIG. 7

| DISK DRIVE NUMBER | DATA POSITION IN DISK DRIVE |
|---|---|
| 113 | 0 |
| 114 | 20 |
| 113 | 24 |
| 115 | 120 |

FIG. 10

| RANGE OF HASH VALUE | COPY RETAINING NODE NUMBER |
|---|---|
| 0~99 | 0 |
| 100~199 | 1 |
| 200~1000 | 2 |
| ⋮ | ⋮ |

FIG. 11

| PRIMARY DATA RETAINING NODE NUMBER | COPY DATA RETAINING NODE NUMBER |
|---|---|
| 0 | 1, 2 |
| 1 | 2, 3 |
| 2 | 3, 4 |
| ⋮ | ⋮ |

FIG. 14

| RANGE OF HASH VALUE | COPY RETAINING NODE NUMBER |
|---|---|
| 0~99 | 121 |
| 100~199 | 122 |
| 200~1000 | 123 |
| 1001~ | 124 |

FIG. 15

| RANGE OF HASH VALUE | COPY RETAINING NODE NUMBER |
|---|---|
| 0～66 | 121 |
| 67～132 | 125 |
| 133～199 | 122 |
| 200～1000 | 123 |
| 1001～ | 124 |

DATA INSERTION SYSTEM, DATA CONTROL DEVICE, STORAGE DEVICE, DATA INSERTION METHOD, DATA CONTROL METHOD, DATA STORING METHOD

TECHNICAL FIELD

The present invention relates to a data insertion system, a data control device, a storage device, a method of inserting data, a method of controlling data, a method of storing data.

BACKGROUND ART

Currently, there is known a distributed data storage delivery system. In the distributed data storage delivery system, user computers each having a storage device that stores data (hereinafter, also referred to as storage node) are connected to plural networks to form a large capacity data storage system. The distributed data storage delivery system has a function of arranging (storing) data, and a function of managing the arrangement of the data (distributed data arrangement management function).

With this configuration, the distributed data storage delivery system employs the distributed data arrangement management function to divide the data transmitted from the user computer into plural data fragments to make the data redundant, and to store the data into plural storage nodes. Then, the user computer connected to the same network uses the distributed data arrangement management function to identify a storage node that has target distributed data, and obtains the distributed data from the storage node.

The distributed data arrangement management function is realized by a metadata server having a centralized management function, or a distributed data index unit having an index function that employs a distributed management function using a distributed hash table. Therefore, in the distributed data storage delivery system, a large amount of data to be stored are stored in the storage nodes in a distributed manner. In such a system, the arrangement of the data largely affects the performance, failure resistance property or availability of the system.

For example, when a magnetic disk drive is used as the storage device, the access performance can be increased by storing two data to which continuous access is highly possible, into physically continuing areas on the same magnetic disk drive. Further, when a performance of the network connected between the storage nodes is low, the performance can be improved by storing data used at the same time into plural different storage nodes. However, when there exists an access that extremely deteriorates the performance, the system cannot respond to the large amount of access, which deteriorates the availability.

As described above, it is important to distribute and arrange the data in a manner that well accords with patterns of simultaneous access or continuous access, or a use tendency of the data such as how existence/absence of access changes over time.

Further, the distributed data storage delivery system may have a data re-arrangement function in which the data that have been once stored are transferred to another storage node through a dynamic data migration function, whereby the arrangement of the data can be changed.

Examples thereof include a case where another storage node is more conformable with the use of the user in terms of configuration of the network, and a case where plural data, which are used simultaneously, are read out in parallel by different storage nodes to improve the system performance.

These are performed using a function of transferring the data through the network, and a function of changing the registered data in an index function included in the distributed data arrangement management function.

However, access to the storage device is necessary at the time of performing the data re-arrangement function in the dynamic data migration function, and hence, it takes several minutes to several hours to complete the re-arrangement of data to an arrangement that is suitable for the data.

Further, in the distributed data storage delivery system, it is possible to increase or decrease the number of storage nodes in the system. For example, a storage node can be added to the distributed data storage delivery system in the case where the system lacks the data supplying ability, or lacks the data storage capacity. Further, when any of the storage nodes breaks down or the amount of data that the system deals with decreases, the distributed data storage delivery system can reduce the number of the storage nodes. Such a change in the system configuration can be made based on information indicating a configuration of the system that the distributed data arrangement management function has and change in the index function.

In the distributed data storage delivery system having the configuration described above, a large volume of data previously stored in another system may be inserted into the distributed data storage delivery system in the case where no data has been registered.

An example of inserting the data as described above includes a case where backup data are restored. First, the distributed data storage delivery system needs to generate, in another storage device (for example, a backup storage device), backup of the stored data in order to prepare for loss of data due to breakdown of the entire distributed data storage delivery system.

An example of the breakdown of the entire system includes trouble with a power source or building facility, software malfunction, and natural disasters. As the backup storage device, it is possible to use a tape device, a disk array, or another distributed data storage delivery system, for example.

It should be noted that, in a backup system for making the backup in the distributed data storage delivery system, it is necessary to make the backup of the entire system at a synchronized, stationary point. This is because there occurs delay in transmitting an instruction between the computers connected in parallel to a network, which makes it difficult to match the backup generation time in each node. Further, since the data are transferred between the nodes, part of the data may get lost or there may exist overlapping data if the backup generation times are shifted from each other between the nodes.

To deal with this, a data management unit that manages the data to be backed up stores a state called a snapshot representing a data set at a certain point consistent throughout the entire system. The snapshot can be generated, for example, by a method described in Patent Document 1. Then, data of the snapshot are transmitted to a backup storage device as the data to be backed up.

Further, Non-patent Document 1 describes a method of generating a snapshot to back up the data of the storage devices connected in parallel, and backing up data of the generated snapshot.

As one example of a method for storing a backup of data in the distributed data storage deliver system, there may be a method of transmitting data stored in each storage node to a predetermined backup storage device after generating a snapshot. In this method, it is necessary to manage the backup data or the backup device for each storage node, requiring a large workload of a manager.

Further, as another method, there may be a method of dividing data into data clusters with fixed lengths such as blocks and chunks or into semantically divided data clusters such as files, and transmitting the data clusters together with identifiers uniquely representing the respective data clusters to the backup storage device to store them.

Then, in the case where data are lost due to occurrence of trouble in the distributed data storage delivery system, the manager restores the data from the backup storage device to the distributed data storage delivery system after fixed or newly structured.

The backup data stored in the backup storage device are copied, for each of the data clusters divided at the time of storing, onto storage nodes in the distributed data storage delivery system after restoring. Each of the storage nodes, which are destinations of the copying, depends on a configuration of the distributed data storage delivery system after restoring, and the destinations of the copying are determined by a data arrangement management function in the distributed data storage delivery system after restoring.

A further copy of the data that have been copied onto the storage node may be arranged in another storage node. This copying is made to prevent the data from being lost due to trouble of the storage node, and is also determined by the data arrangement management function of the distributed data storage delivery system after restoring.

As yet another example, in the case where data in a conventionally operated system are transferred to a distributed data storage delivery system that is newly configured and has a high performance, a large volume of data are inserted from the old system to the new system.

In this case, the data stored in the old system are divided into data clusters with fixed lengths such as blocks and chunks or into semantically divided data clusters such as files, and are copied onto the new distributed data storage delivery system, together with identifiers uniquely representing the respective data clusters.

RELATED DOCUMENTS

Patent Document

Patent Document 1: Japanese Patent Application Laid-open No. 2004-38929

Non-Patent Document

Non-Patent Document 1: "SnapshotIQ" by Isilon Systems, Inc. http://www.isilon.co.jp/materials/brochures/30480_Snapshot.pdf, 2008

SUMMARY OF THE INVENTION

In the distributed data storage deliver system having the configuration described above, at the time when the large amount of data are inserted into the distributed data storage deliver system, a data distribution arrangement that matches the use tendency may exist in the data stored in the backup storage device. Unfortunately, in this case, when the large volume of data is simply inserted into the distributed data storage delivery system, the data inserted into the system are distributed and arranged in a manner that does not match the use tendency.

More specifically, in the example of backing up and restoring of the data as described above, the configuration such as the performance or the capacity of the storage nodes or the configuration of the storage capacity may differ between the time when the data are backed up and the time when the data are restored. Therefore, if the data stored in the backup storage device are simply inserted into the distributed data storage delivery system, there may occur a case where, in the distributed data storage delivery system after restoring, the data are distributed and arranged in a manner that does not match the use tendency of the data.

The present invention has been made in view of the circumstances described above, and an object of the present invention is to provide a data insertion system, a data control device and a storage device, for inserting data into a distributed data storage delivery system on the basis of use tendency of data stored in a backup storage device.

According to the present invention, there is provided a data insertion system having a data storage device that stores predetermined data; a storage device that receives the data from the data storage device; and, a data control device that selects the data transmitted from the data storage device to the storage device, the data insertion system which includes: a first distribution index information obtaining unit that obtains, as first distribution index information, first data arrangement information concerning the data stored in the data storage device and relating to a time when the stored data are arranged in the storage device; a configuration information request unit that requests, from the storage device, system configuration information indicating a configuration of storage areas that the storage device has, and second distribution index information indicating second data arrangement information of the storage device; a device distribution index information generation unit that generates the system configuration information and the second distribution index information on the basis of the configuration of the storage areas; and, a new data arrangement information generation unit that generates new data arrangement information on the basis of the system configuration information and the second distribution index information generated by the device distribution index information generation unit, and the first distribution index information obtained by the first distribution index information obtaining unit, in which the new data arrangement information generation unit stores the data stored in the data storage device into the storage areas on the basis of the generated new data arrangement information.

According to the present invention, there is provided a data control device in the data insertion system and having a data storage device that stores predetermined data; a storage device that receives the data from the data storage device; and, the data control device that selects the data transmitted from the data storage device to the storage device, the data control device which includes: a first distribution index information obtaining unit that obtains, as first distribution index information, first data arrangement information concerning the data stored in the data storage device and relating to a time when the stored data are arranged in the storage device, the first data arrangement information; a configuration information request unit that requests, from the storage device, system configuration information indicating a configuration of storage areas that the storage device has, and second distribution index information indicating second data arrangement information of the storage device; a second distribution index information receiving unit that receives the system configuration information and the second distribution index information each requested by the configuration information request unit; and a new data arrangement information generation unit that generates new data arrangement information on the basis of the system configuration information and the second distribution index information each received by the second distribution index information receiving unit, and the first distribution index information obtained by the first distribution index information obtaining unit, in which the new data arrangement information generation unit stores the data stored in the data storage device into the storage areas on the basis of the generated new data arrangement information.

According to the present invention, there is provided a storage device in the data insertion system having a data storage device that stores predetermined data; the storage device that receives the data from the data storage device; and, a data control device that selects the data transmitted from the data storage device to the storage device, the storage device which includes: a plurality of storage areas that store data; a device distribution index information generation unit that generates system configuration information indicating a configuration of the storage areas and second distribution index information indicating predetermined data arrangement information on the basis of the configuration of the storage areas; a device distribution index information transmission unit that transmits the system configuration information and the second distribution index information each generated by the device distribution index information generation unit to the data control device; a new distribution index information receiving unit that receives new data arrangement information generated by a new data arrangement information generation unit as new distribution index information; and, a storage applicability determination unit that determines whether or not it is applicable to store the data stored in the data storage device into the storage areas on the basis of the new distribution index information received by the new distribution index information receiving unit.

According to the present invention, there is provided a data insertion method for a data insertion system having a data storage device that stores predetermined data; a storage device that receives the data from the data storage device; and, a data control device that selects the data transmitted from the data storage device to the storage device, the method which includes: a first distribution index information obtaining step of obtaining, as first distribution index information, first data arrangement information concerning the data stored in the data storage device and relating to a time when the stored data are arranged in the storage device; a configuration information request step of requesting, from the storage device, system configuration information indicating a configuration of storage areas that the storage device has, and second distribution index information indicating second data arrangement information of the storage device; a device distribution index information generation step of generating the system configuration information and the second distribution index information on the basis of the configuration of the storage areas; and, a new data arrangement information generation step of generating new data arrangement information on the basis of the system configuration information and the second distribution index information generated in the device distribution index information generation step, and the first distribution index information obtained in the first distribution index information obtaining step, in which, in the new data arrangement information generation step, the data stored in the data storage device are stored into the storage areas on the basis of the generated new data arrangement information.

According to the present invention, there is provided a data control method for a data control device in the data insertion system having a data storage device that stores predetermined data; a storage device that receives the data from the data storage device; and, the data control device that selects the data transmitted from the data storage device to the storage device, the method including: a first distribution index information obtaining step of obtaining, as first distribution index information, first data arrangement information concerning the data stored in the data storage device and relating to a time when the stored data are arranged in the storage device; a configuration information request step of requesting, from the storage device, system configuration information indicating a configuration of storage areas that the storage device has, and second distribution index information indicating the second data arrangement information of the storage device; a second distribution information receiving step of receiving the system configuration information and the second distribution index information requested in the configuration information request step; and a new data arrangement information generation step of generating new data arrangement information on the basis of the system configuration information and the second distribution index information each received in the second distribution index information receiving step, and the first distribution index information obtained in the first distribution index information obtaining step, in which, in the new data arrangement information generation step, the data stored in the data storage device are stored into the storage areas on the basis of the generated new data arrangement information.

According to the present invention, there is provided a data storing method for a storage device in the data insertion system having a data storage device that stores predetermined data; the storage device that receives the data from the data storage device and includes a plurality of storage areas that store data; and, a data control device that selects the data transmitted from the data storage device to the storage device, the method including: a device distribution index information generation step of generating system configuration information indicating a configuration of the storage areas and second distribution index information indicating predetermined data arrangement information on the basis of the configuration of the storage areas; a device distribution index information transmission step of transmitting the system configuration information and the second distribution index information generated in the device distribution index information generation step to the data control device; a new distribution index information receiving step of receiving new data arrangement information generated in a new data arrangement information generation step as new distribution index information; and, a storage applicability determination step of determining whether or not it is applicable to store the data stored in the data storage device into the storage areas on the basis of the new distribution index information received in the new distribution index information receiving step.

According to the present invention, there is provided a data control program that causes a data control device in the data insertion system having a data storage device that stores predetermined data; a storage device that receives the data from the data storage device; and, the data control device that selects the data transmitted from the data storage device to the storage device, to execute data processing, and a storing medium for storing the data control program, the data processing includes: a first distribution index information obtaining procedure of obtaining, as first distribution index information, first data arrangement information concerning the data stored in the data storage device and relating to a time when the stored data are arranged in the storage device; a configuration information request procedure of requesting, from the storage device, system configuration information indicating a configuration of storage areas that the storage device has, and second distribution index information indicating second data arrangement information of the storage device; a second distribution information receiving procedure of receiving the system configuration information and the second distribution index information requested in the configuration information request procedure; and a new data arrangement information generation procedure of generating new data arrangement information on the basis of the system configuration information and the second distribution index information received in the second distribution index information receiving procedure, and the first distribution index information obtained in the first distribution index information obtaining procedure, in which, in the new data arrangement information generation procedure, the data stored in the data storage device are stored into the storage areas on the basis of the generated new data arrangement information.

According to the present invention, there is provided a data storage program that causes a storage device in the data insertion system having a data storage device that stores predetermined data; the storage device that has a plurality of storage areas for storing data and receives the data from the data storage device; and, a data control device that selects the data transmitted from the data storage device to the storage device, to execute data processing, and a storing medium for storing the data storage program, the data processing including: a device distribution index information generation procedure of generating system configuration information indicating a configuration of the storage areas and second distribution index information indicating predetermined data arrangement information on the basis of the configuration of the storage areas; a device distribution index information transmission procedure of transmitting the system configuration information and the second distribution index information each generated in the device distribution index information generation procedure to the data control device; a new distribution index information receiving procedure of receiving new data arrangement information generated in a new data arrangement information generation procedure as new distribution index information; and, a storage applicability determination procedure of determining whether or not it is applicable to store the data stored in the data storage device into the storage areas on the basis of the new distribution index information received in the new distribution index information receiving procedure.

According to the present invention, there is provided a data insertion system, a data control device, a storage device, a method of controlling data, a method of storing data, a data control program, a data storage program, and a storage medium storing the same, for inserting data in a distributed data storage delivery system on the basis of a use tendency of data stored in a backup storage device.

BRIEF DESCRIPTION OF THE DRAWINGS

The above-described object and other objects of the present invention, and features and advantages of the present invention will be made further clear by the preferred exemplary embodiment described below and the following attached drawings.

FIG. 3 is a diagram illustrating one example of data arrangement information according to the first exemplary embodiment;

FIG. 6 is a diagram illustrating one example of first distribution index information of the data insertion system according to the first exemplary embodiment;

FIG. 7 is a diagram illustrating one example of second distribution index information of the data insertion system according to the first exemplary embodiment;

FIG. 10 is a diagram illustrating a node allocation table according to the second exemplary embodiment;

FIG. 11 is a diagram illustrating a copy allocation table according to the second exemplary embodiment;

FIG. 14 is a diagram illustrating one example of a node allocation table before change in the data insertion system according to a third exemplary embodiment; and FIG. 15 is a diagram illustrating one example of a node allocation table after change in the data insertion system according to the third exemplary embodiment.

DESCRIPTION OF EMBODIMENTS

[First Exemplary Embodiment]

Figure 1:
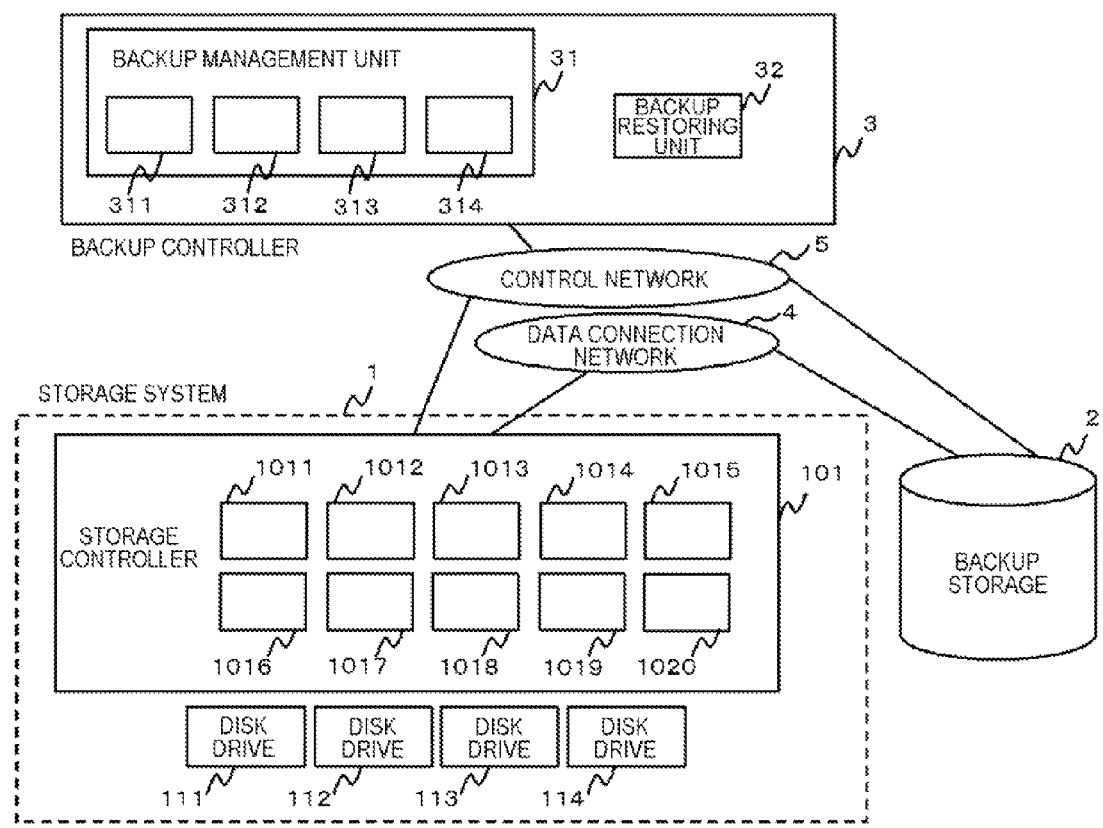
FIG. 1 is a schematic configuration view illustrating a data insertion system according to a first exemplary embodiment.

Hereinbelow, an exemplary embodiment of the present invention will be described with reference to the drawings. Note that, in all the drawings, the same constituent components are denoted with the same reference numerals, and the detailed explanation thereof will not be repeated.

FIG. 1 is a schematic configuration view illustrating a data restoring system (data insertion system) according to this exemplary embodiment. The data restoring system illustrated in FIG. 1 provides a data restoring system having a backup storage (data storage device) 2 that stores predetermined data; a storage system (storage device) 1 that receives the data from the backup storage 2; and, a backup controller (data control device) 3 that selects data transmitted from the backup storage 2 to the storage system 1. The data restoring system includes: a first distribution index information obtaining unit 311 that obtains, as first distribution index information, first data arrangement information concerning the data stored in the backup storage 2 and relating to a time when the stored data are arranged in the storage system 1; a configuration information request unit 312 that requests system configuration information indicating a configuration of disk drives (storage areas) 111 to 114 that the storage system 1 has, and second distribution index information indicating second data arrangement information of the storage system 1 from the storage system 1; a device distribution index information generation unit 1011 that generates the system configuration information and the second distribution index information on the basis of the configuration of the disk drives 111 to 114; and, a new data arrangement information generation unit 314 that generates new data arrangement information on the basis of the system configuration information and the second distribution index information generated by the device distribution index information generation unit 1011, and the first distribution index information obtained by the first distribution index information obtaining unit 311. Further, the new data arrangement information generation unit 314 stores the data stored in the backup storage 2 into the disk drives 111 to 114 on the basis of the generated new data arrangement information.

As described above, in this exemplary embodiment, the new data arrangement information generation unit 314 generates the new data arrangement information on the basis of the system configuration information, the second distribution index information, and the first distribution index information. Further, the new data arrangement information generation unit 314 stores the data stored in the backup storage 2 into the storage areas in the disk drives 111 to 114 on the basis of the generated new data arrangement information.

Therefore, with this exemplary embodiment, the data restoring system can store the data stored in the backup storage 2 into the disk drives 111 to 114 on the basis of the generated new data arrangement information. This enables the data restoring system to restore the data stored in the backup storage 2 to the storage system 1 on the basis of use tendency of the data stored in the backup storage 2 even at the time when the large volume of the data is inserted.

It should be noted that, in this exemplary embodiment, in connection with the data stored in the backup storage 2, it is possible to consider the first data arrangement information relating to the time when the stored data are arranged in the storage system 1, to be the information containing the use tendency. More specifically, by reflecting the first data arrangement information at the time when the new data arrangement information is generated, it is possible to restore the optimized data at the time of making the backup.

As described above, the data restoring system can restore the storage system 1 using the most of the first distribution index information stored in the backup storage 2, whereby it is possible to restore the storage system 1 in a manner that reflects the use tendency of the data.

It should be noted that the disk drives 111 to 114 serving as the storage areas and the distribution index information will be described in detail later.

The backup controller 3 has the first distribution index information obtaining unit 311 that obtains, as the first distribution index information, the first data arrangement information concerning the data stored in the backup storage 2 and relating to the time when the stored data are arranged in the storage system 1; the configuration information request unit 312 that requests, from the storage system 1, the system configuration information indicating the configuration of the disk drives (storage areas) 111 to 114 that the storage system 1 has, and the second distribution index information indicating the second data arrangement information of the storage system 1; a second distribution index information receiving unit 313 that receives the system configuration information and the second distribution index information requested by the configuration information request unit 312; the new data arrangement information generation unit 314 that generates the new data arrangement information on the basis of the system configuration information and the second distribution index information received by the second distribution index information receiving unit 313, and the first distribution index information obtained by the first distribution index information obtaining unit 311. Further, the new data arrangement information generation unit 314 stores the data stored in the backup storage 2 into storage areas on the basis of the generated new data arrangement information.

The storage system 1 has the disk drives (plural storage areas) 111 to 114 that store data, and includes: the device distribution index information generation unit 1011 that generates the system configuration information indicating the configuration of the storage areas and the second distribution index information indicating predetermined data arrangement information on the basis of the configuration of the disk drives 111 to 114; a device distribution index information transmission unit 1012 that transmits the system configuration information and the second distribution index information generated by the device distribution index information generation unit 1011 to the backup controller 3; a new distribution index information receiving unit 1013 that receives the new data arrangement information generated by the new data arrangement information generation unit 314 as new distribution index information; and, a storage applicability determination unit 1014 that determines on the basis of the new distribution index information received by the new distribution index information receiving unit 1013 whether or not it is applicable to store the data stored in the backup storage 2 into the disk drives 111 to 114.

The new data arrangement information generation unit 314 generates new data arrangement information that maintains at least a part of arrangement positions of the data arranged in the disk drives 111 to 114 on the basis of link information indicating relativity at the time when the data are arranged in the disk drives 111 to 114.

With this configuration in this exemplary embodiment, the new data arrangement information is generated on the basis of information, which is the link information indicating the relativity between the data and which contains at least a part of the arrangement information stored in the storage system 1, whereby it is possible to restore the data that have been optimally arranged while reflecting the use tendency. Further, arrangement information based on types of the data used, arrangement information of the data obtained as a result of performing defragmentation and other arrangement information can be considered as one mode of the link information indicating the relativity between the data.

Further, since the new data arrangement information generation unit 314 can reflect the link information indicating the relativity between the data to the new data arrangement information, it is possible to store the target data while taking sequential access into consideration and making the most of the performances of the disk drives 111 to 114. Note that the link information indicating the relativity between the data will be described in detail in a third exemplary embodiment.

The storage applicability determination unit 1014 may determine the applicability of storing the data stored in the backup storage 2 into the disk drives 111 to 114 on the basis of the new data arrangement information generated by the new data arrangement information generation unit 314 and the storage capacity of each of the disk drives 111 to 114.

In this case, since the new data arrangement information and the storage capacity of each of the disk drives 111 to 114 can be taken into consideration, it is possible to determine the applicability of storing the target data after enhancing the possibility of storing the data into the disk drives 111 to 114 so as to avoid troubles.

The storage system 1 further has: a backup receiving unit 1015 that receives an instruction to make a backup of the data stored in the disk drives 111 to 114; a data transmission output unit 1016 that makes a copy of data stored in the disk drives 111 to 114 upon receiving the instruction to make the backup by the backup receiving unit 1015, and transmits the made copy to the data storage unit; and, a distribution index information generation unit 1017 that generates, as the first distribution index information, the data arrangement information at the time when the data are arranged in the disk drives 111 to 114 on the basis of the copy transmitted by the data transmission output unit 1016.

In other words, in this exemplary embodiment, the storage system 1 has the storage controller 101 and the disk drives 111 to 114. The storage controller 101 has the device distribution index information generation unit 1011, the device distribution index information transmission unit 1012, the new distribution index information receiving unit 1013, the storage applicability determination unit 1014, and the backup receiving unit 1015. Further, the storage controller 101 has the data transmission output unit 1016 and the distribution index information generation unit 1017.

The storage system 1 is connected through the storage controller 101 to a data connection network 4 and a control network 5.

The backup controller 3 has a backup management unit 31 and a backup restoring unit 32. The backup management unit 31 has the first distribution index information obtaining unit 311, the configuration information request unit 312, the second distribution index information receiving unit 313, and the new data arrangement information generation unit 314. Further, in the backup controller 3, the backup management unit 31 and the backup restoring unit 32 are realized by a not-shown central processing unit (CPU), a memory, a program storage area, a network connection function and the like.

The data restoring system illustrated in FIG. 1 is connected to the backup storage 2 having plural disk drives. The backup storage 2 has a larger capacity than the storage system 1 has.

Figure 2:
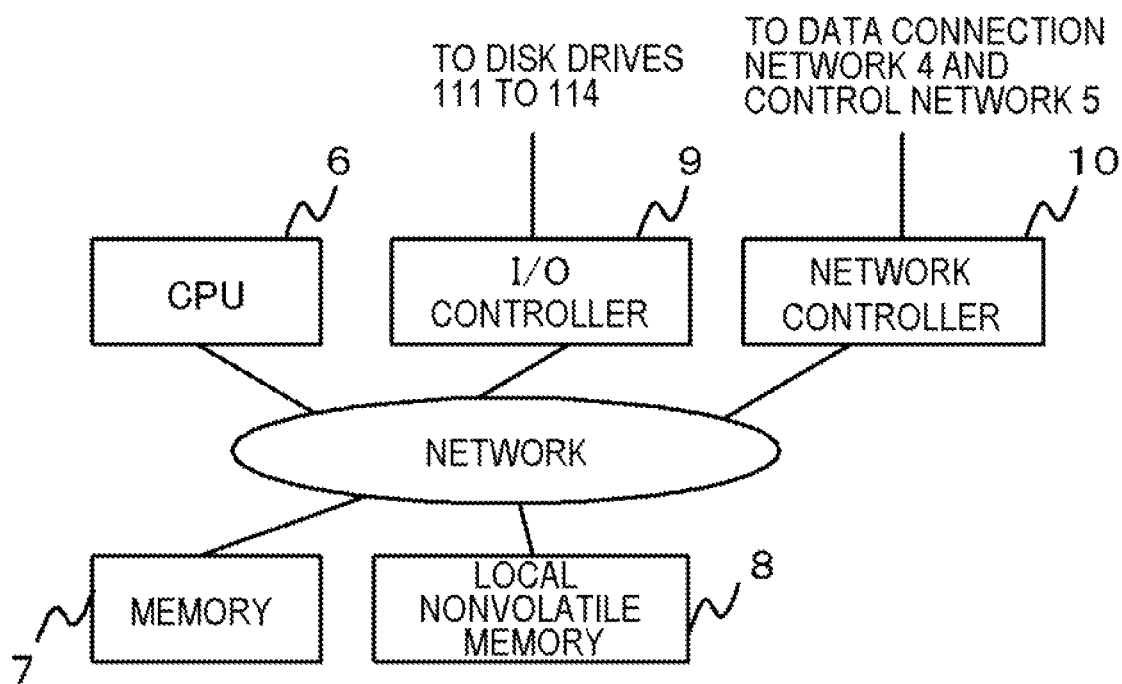
FIG. 2 is a hardware block diagram of a storage controller according to the first exemplary embodiment.

FIG. 2 is a hardware block diagram of the storage controller 101. The storage controller 101 illustrated in FIG. 2 has a CPU 6 that governs an entire control of the storage system 1, a memory 7 that temporarily stores data, and a local nonvolatile memory 8 that stores a program and the like. Further, the storage controller 101 has an I/O controller 9 that controls the disk drives 111 to 114, and a network controller 10 for connecting to the data connection network 4 or the control network 5.

The data arrangement information of each of the disk drives 111 to 114 of the storage system 1 is stored in the memory 7 and the local nonvolatile memory 8 of the storage controller 101. FIG. 3 illustrates one example of the data arrangement information.

FIG. 3 illustrates a data arrangement information table indicative of one example of the data arrangement information stored in the memory 7. In this exemplary embodiment, the data are stored on a fixed-length block basis. The term block as used herein means a unit uniquely identified in the storage system 1 by combining volume numbers with relative block numbers by which blocks can be uniquely identified in the volume numbers. Further, block numbers represent combinations of blocks.

The data arrangement information table illustrated in FIG. 3 is a table from which numbers of stored disk drives and data positions on the disk drives can be extracted on the basis of the block numbers. Further, a program that extracts numbers of the disk drives and the data positions on the numbers of the disk drives on the basis of the block numbers is installed.

As described above, in this exemplary embodiment, the data arrangement information contains the block numbers, the numbers of the disk drives and arrays of data arrangement as the distribution index information. Note that, in the case where the data are stored in the backup storage 2, identifiers indicating the backup are attached in addition to the block numbers of the data arrangement information.

Next, description will be made of a backup process of the data restoring system according to this exemplary embodiment with reference to the sequence diagram shown in FIG. 4.

Figure 4:
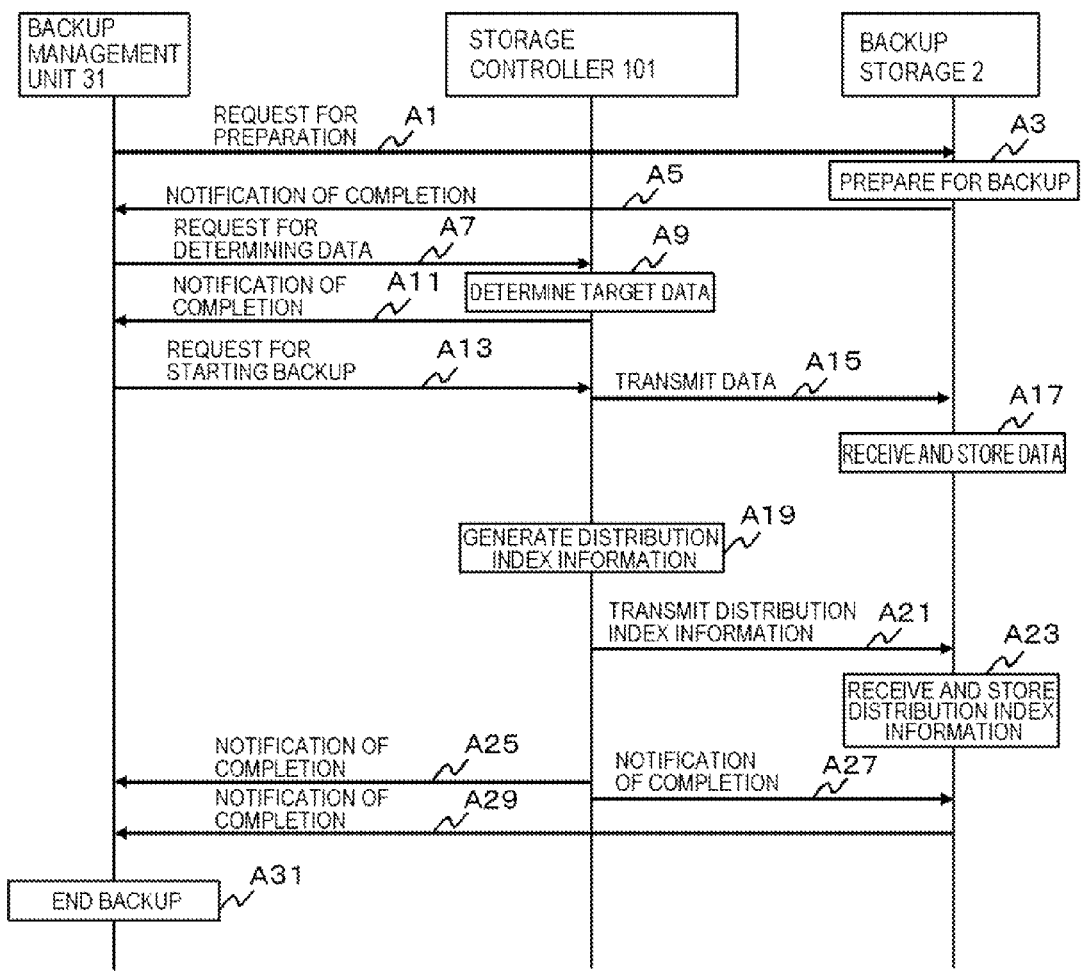
FIG. 4 is a diagram illustrating one example of a sequence diagram at the time of backup of a data insertion system according to the first exemplary embodiment.

In the sequence diagram of the data restoring system illustrated in FIG. 4, the backup management unit 31 requests the backup storage 2 to prepare for making a backup (step A1). This preparation request contains backup identification names, and addresses of the disk drives 111 to 114, which are backup sources. The backup storage 2 prepares for receiving the data in response to the preparation instruction containing the backup identification names and an address of the storage controller 101, which is a backup source (step A3). This preparation includes generating a network receiving port, and identifying a data recording medium, for example.

After completing the preparation for the backup, the backup storage 2 transmits, to the backup management unit 31, a notification indicating that the preparation is completed (step A5).

The backup management unit 31 determines data to be backed up, and notifies the storage controller 101 of the target data to be backed up (step A7). Note that the target data to be backed up may be set in advance by the backup management unit 31, or all of the data may be determined as the target data. Further, it may be possible to determine only a volume that a target user uses as the target data.

The storage controller 101 receives the notification from the backup management unit 31, and determines the target data (step A9). Then, the storage controller 101 notifies the backup management unit 31 that determination of the data is completed (step A11).

It should be noted that, as for the processes from step A1 to step A11, step A1 and step A7 may be performed at the same time, or the processes from A7 to A11 may be performed earlier than the processes from step A1 to step A5.

Next, upon receiving the notification that the storage controller 101 and the backup storage 2 complete the preparation for the backup, the backup management unit 31 transmits, to the storage controller 101, a request for starting the backup (step A13). Upon receiving the request for starting the backup, the storage controller 101 transmits the target data to the backup storage 2 (step A15).

Upon receiving the target data to be backed up, the backup storage 2 records and stores the received data (step A17). At this time, the backup storage 2 generates an internal index structure, from which storage positions of the received data can be obtained, on the basis of the backup identification names and the block numbers. Then, the backup storage 2 records the internal index structure.

The storage controller 101 generates distribution index information on the target data that are transmitted to the backup storage 2 (step A19). Then, the storage controller 101 transmits the generated distribution index information to the backup storage 2 (step A21).

Upon receiving the distribution index information from the storage controller 101, the backup storage 2 stores the distribution index information into the disk drive (step A23).

After completing the transmission of the target data to the backup storage 2, the storage controller 101 transmits a notification of completion indicating that transmission of the target data is completed, to the backup management unit 31 and the backup storage 2 (step A25, A27). After completing: receiving the target data from the storage controller 101; receiving the distribution index information from the storage controller 101; recording the internal index structure; and receiving the notification of completion from the storage controller 101, the backup storage 2 transmits, to the backup management unit 31, the notification of completion indicating that the backup is completed (step A29).

Upon receiving the notifications of completion from the storage controller 101 and the backup storage 2, the backup management unit 31 ends the backup process (step A31).

Next, a data restoring process of the data restoring system according to this exemplary embodiment will be described with reference to the sequence diagram shown in FIG. 5.

In this exemplary embodiment, it is assumed, as one example, that the disk drive 112 in the storage system 1 breaks down, a not-shown disk drive 115 having the same performance is inserted in place of the broken down disk drive 112, and backup data are restored from the backup storage 2.

Figure 5:
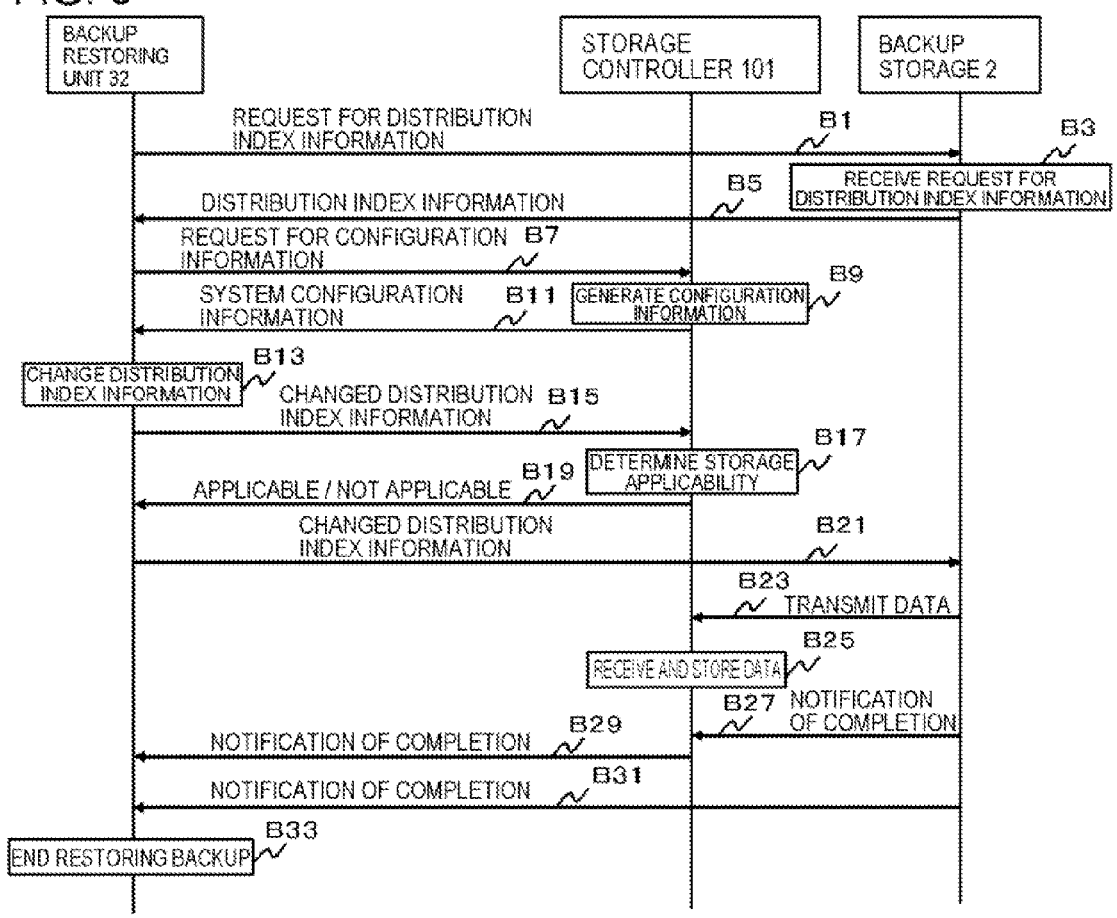
FIG. 5 is a diagram illustrating one example of a sequence diagram at the time of data restoring operation of the data insertion system according to the first exemplary embodiment.

In the sequence diagram of the data restoring system shown in FIG. 5, the backup restoring unit 32 requests, from the backup storage 2, distribution index information containing a backup identification name (step B1). The backup storage 2 receives the request for the distribution index information containing the backup identification name from the backup restoring unit 32 (step B3). The backup storage 2 transmits the distribution index information (first distribution index information) concerning the target data to be backed up of the designated backup identification name to the backup restoring unit 32 (step B5).

Next, the backup restoring unit 32 requests configuration information of the storage system 1 from the storage controller 101 (step B7). The storage controller 101 generates system configuration information and distribution index information corresponding to the request for the configuration information (step B9).

The system configuration information includes, for example, a number list of disk drives, and a list of capacity values of the disk drives. Note that items other than those described above will be described in a second exemplary embodiment. Further, for the distribution index information, second distribution index information is generated on the basis of the current use tendency of the data restoring system. More specifically, the second distribution index information indicating the current use tendency corresponding to the distribution index information illustrated in FIG. 3 is generated.

The storage controller 101 transmits the generated system configuration information and the generated second distribution index information to the backup restoring unit (step B11).

Upon receiving the first distribution index information, the system configuration information and the second distribution index information obtained in step B11, the backup restoring unit 32 generates new distribution index information reflecting these pieces of information (hereinafter, referred to as new distribution index information), and makes changes from the first distribution index information (step B13). The new distribution index information is generated on the basis of the first distribution index information stored in the backup storage 2 such that at least a part of the new distribution index information contains the first distribution index information. In this exemplary embodiment, this makes it possible to reflect the first distribution index information.

This example will be described with reference to FIG. 6 and FIG. 7. FIG. 6 illustrates a part of the first distribution index information. FIG. 7 illustrates a part of the second distribution index information.

The backup restoring unit 32 generates the new distribution index information on the basis of the first distribution index information, the system configuration information and the second distribution index information. By comparing between FIG. 6 and FIG. 7, a disk drive number in the second distribution index information illustrated in FIG. 7 is different in a given block number from that in the first distribution index information illustrated in FIG. 6. More specifically, this comparison indicates that the disk drive 115 in FIG. 7 is changed from the disk drive 112 in FIG. 6. Positions of the data in other disk drives are the same.

Since the disk drive 112 is removed and the disk drive 115 is added, the new distribution index information is generated such that all the portions indicating the disk drive 112 in the first distribution index information are changed into the disk drive 115 in the new distribution index information. Therefore, with this new distribution index information, it is possible to reflect the past use tendency in the drives other than the disk drive 115.

Then, the backup restoring unit 32 transmits, to the storage controller 101, the new distribution index information generated by making the changes from the first distribution index information (step B15).

With this configuration, the data that have been arranged in the same disk drive in the data arrangement positions at the time of backing up the data can be positioned to the same disk drive even in the new data arrangement positions, whereby it is possible to maintain the sequential access performance.

It should be noted that the first distribution index information and the second distribution index information are described as examples, and this exemplary embodiment is not limited to this.

The storage controller 101 obtains the generated new distribution index information, compares the current states of the disk drives 111, 113, 114 and 115, and determines the applicability for storage (step B17). If the disk drives are applicable for storing, the storage controller 101 transmits, to the backup restoring unit 32, a response indicating that storing is possible. On the other hand, if the disk drives are not applicable for storing, the storage controller 101 transmits, to the backup restoring unit 32, a response indicating that storing is not possible (step B19).

It should be noted that the data cannot be stored, for example, in the case where time limitation occurs in accessing the data resulting from processing load of the CPU, or access to the data is not possible due to physical limitation of a storage device that is not contained in the system configuration information or other factors.

Upon receiving from the storage controller 101 the response indicating that storing is possible, the backup restoring unit 32 transmits the new distribution index information, in which changes have been made from the first distribution index information, to the backup storage 2 (step B21). The backup storage 2 transmits the target data to the storage controller 101 on the basis of the new distribution index information (step B23).

The storage controller 101 stores the block into any of the corresponding disk drives 111, 113, 114 and 115 on the basis of the disk drive numbers in the changed distribution index information (step B25). The storage controller 101 reflects positions of the storing disk to the latest distribution index information.

After transmitting all the target data to be backed up, the backup storage 2 transmits, to the storage controller 101, a notification of completion indicating that transmission of the data is completed (step B27). Then, upon receiving the notification of completion from the backup storage 2, the storage controller 101 records all the target data to be backed up, and thereafter, transmits a notification of completion to the backup restoring unit 32 (step B29).

Further, the backup storage 2 transmits, to the backup restoring unit 32, the notification of completion indicating that all the target data to be backed up are transmitted (step B31).

Upon receiving the notifications of completion from the storage controller 101 and the backup storage 2, the backup restoring unit 32 determines that the backup restoring process is completed, and ends the process (step B33).

As described above, in the data restoring system in the first exemplary embodiment, the data stored in the backup storage 2 can be stored into the disk drives 111 to 114 on the basis of the generated new distribution index information. This makes it possible for the data restoring system to restore the data stored in the backup storage 2 to the storage system 1 on the basis of the use tendency of the data even at the time of inserting the large volume of data.

[Second Exemplary Embodiment]

Figure 8:
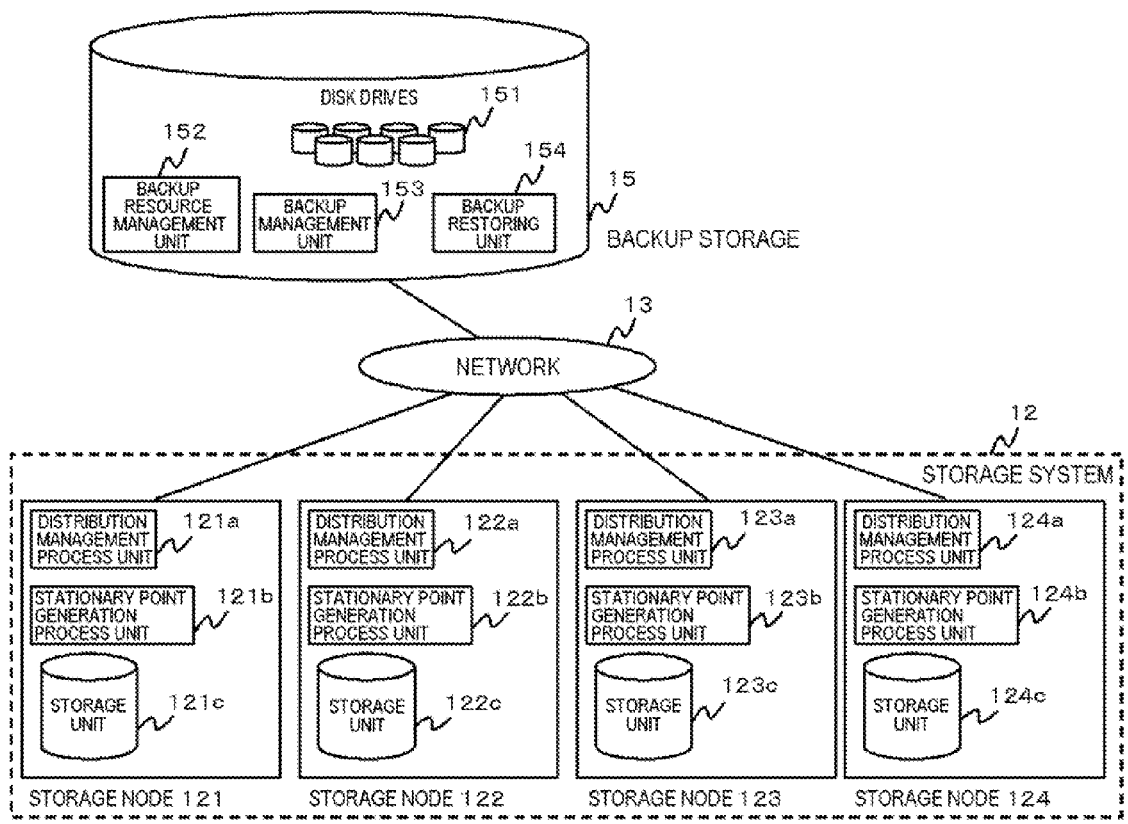
FIG. 8 is a functional block diagram illustrating a data insertion system according to a second exemplary embodiment.

FIG. 8 is a functional block diagram illustrating a data restoring system according to a second exemplary embodiment of the present invention. The data restoring system illustrated in FIG. 8 relates to a system for backing up and restoring data stored in a storage system 12. The data stored in the storage system 12 are backed up in a backup storage 15. Then, the data backed up in the backup storage 15 are restored to the storage system 12 whose configuration has been changed.

The storage system 12 further has a data receiving unit 1018 that receives data transmitted from the backup storage 2 as data to be stored into the disk drives 111 to 114, and a copy allocation unit 1019 that generates redundant data concerning each of the data received by the data receiving unit 1018 to store the generated redundant data to each of the disk drives 111 to 114.

The storage system 1 further has a stationary point generation unit 1020 that generates stationary point information at a predetermined point in time in connection with the data stored in the disk drives 111 to 114. The data transmission output unit 1016 transmits the data stored in the disk drives 111 to 114 to the backup storage 2 on the basis of the stationary point information generated by the stationary point generation unit 1020.

The storage system 12 is formed by storage nodes 121 to 124, which are computers. Each of the storage nodes 121 to 124 has a CPU, a memory, a disk drive and a network controller. Therefore, each of the storage nodes 121 to 124 functions as a data storage device that stores the data in the disk drives.

Distribution management process units 121*a* to 124*a* in FIG. 8 are programs that run on the respective storage node 121 to 124. Further, through the network 13, each of the distribution management process units 121*a* to 124*a* exchanges access information on the data stored in each of the storage units 121*c* to 124*c* of each storage node. With this configuration of the storage system 12, the storage units 121*c* to 129*c* of the storage nodes 121 to 129 are made perceived as if they were one file server.

Stationary point generation process units 121*b* to 124*b* are programs that run on the respective storage nodes 121 to 124, and each generate a snapshot image consistent throughout the stored data. The stationary point generation process units 121*b* to 124*b* record a current version of the stored data, generate a stationary point number upon receiving an instruction to generate the stationary point, and generate data that associate the version with the stationary point. Then, when an access to the data occurs, the stationary point generation process units 121*b* to 124*b* generate differential data with respect to the data of the version at the time of generating the stationary point, and update a version number of the data.

The storage system 12 is configured such that the storage nodes 121 to 124 can be connected to the network 13, and the distribution management process units 121*a* to 124*a* can transmit and receive data with each other.

Further, the storage system 12 is connected through the network 13 to the backup storage 15.

The backup storage 15 has disk drives 151 and a backup file server function. The backup file server function includes a CPU, a memory, a program storage area, and a network connection function.

More specifically, the backup file server function has a function of a backup resource management unit 152, a function of a backup management unit 153, and a function of a backup restoring unit 154. The backup resource management unit 152 manages inputs and outputs of data on the disk drives 151. The backup management unit 153 controls backup operations of data. The backup restoring unit 154 controls restoring of the backup data to the system.

The data arrangement to the storage nodes is determined by the distribution management process unit 121*a* to 124*a* that run on the storage nodes. The distribution management process units 121*a* to 124*a* each have a hash function h (d) that outputs a certain integer value in response to a certain byte column d, and a node allocation table based on the range outputted from the hash function.

Figure 9:
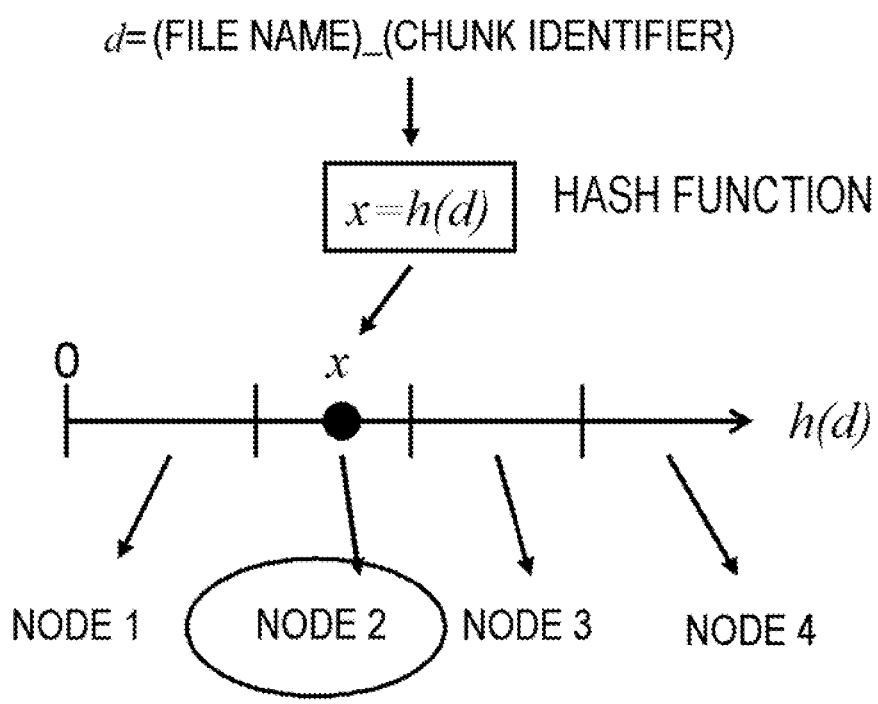
FIG. 9 is a diagram illustrating a node allocation operation with a hash function h(d) according to the second exemplary embodiment.

FIG. 9 is a diagram illustrating a node allocation operation with the hash function h (d). Upon receiving a storage request containing data (file) with a certain length, which is a file name, the storage system 12 divides the received data into plural data segments (chunks) having a fixed length determined by a distribution management process. Continuous chunk identifiers are attached to the respective chunks, and a value obtained by adding the file name and the chunk identifier is inputted to the hash function h (d). Then, on the basis of the outputted hash value, the node for storing the data is determined with reference to the node allocation table.

FIG. 10 is a diagram illustrating one example of the node allocation table. The data storing node for storing the data is determined by a copy retaining node number on the basis of the outputted hash value. Then, the target data is transferred to the node for the storing the data as main data.

At the same time, the distribution management process determines a copy retaining node from among nodes for storing the data determined on the basis of the copy allocation table. Then, the distribution management process transmits the same data to the copy retaining node as copy data.

FIG. 11 is a diagram illustrating one example of the copy allocation table. On the basis of the copy allocation table illustrated in FIG. 11, data of a node corresponding to a primary data retaining node number are transmitted to a node corresponding to a copy data retaining node number as copy data.

The distribution management process has a function of outputting a hash function program, the node allocation table and the copy allocation table as partial distribution index information.

It should be noted that this exemplary embodiment is not limited to this, and for example, it may be possible to employ a configuration in which parity data generated through an exclusive OR of data in a predetermined number of chunks are used as redundant data, and the redundant data are managed using the allocation table similarly to copy data.

Next, a backup process of the data restoring system according to this exemplary embodiment will be described with reference to a sequence diagram in FIG. 12.

Figure 12:
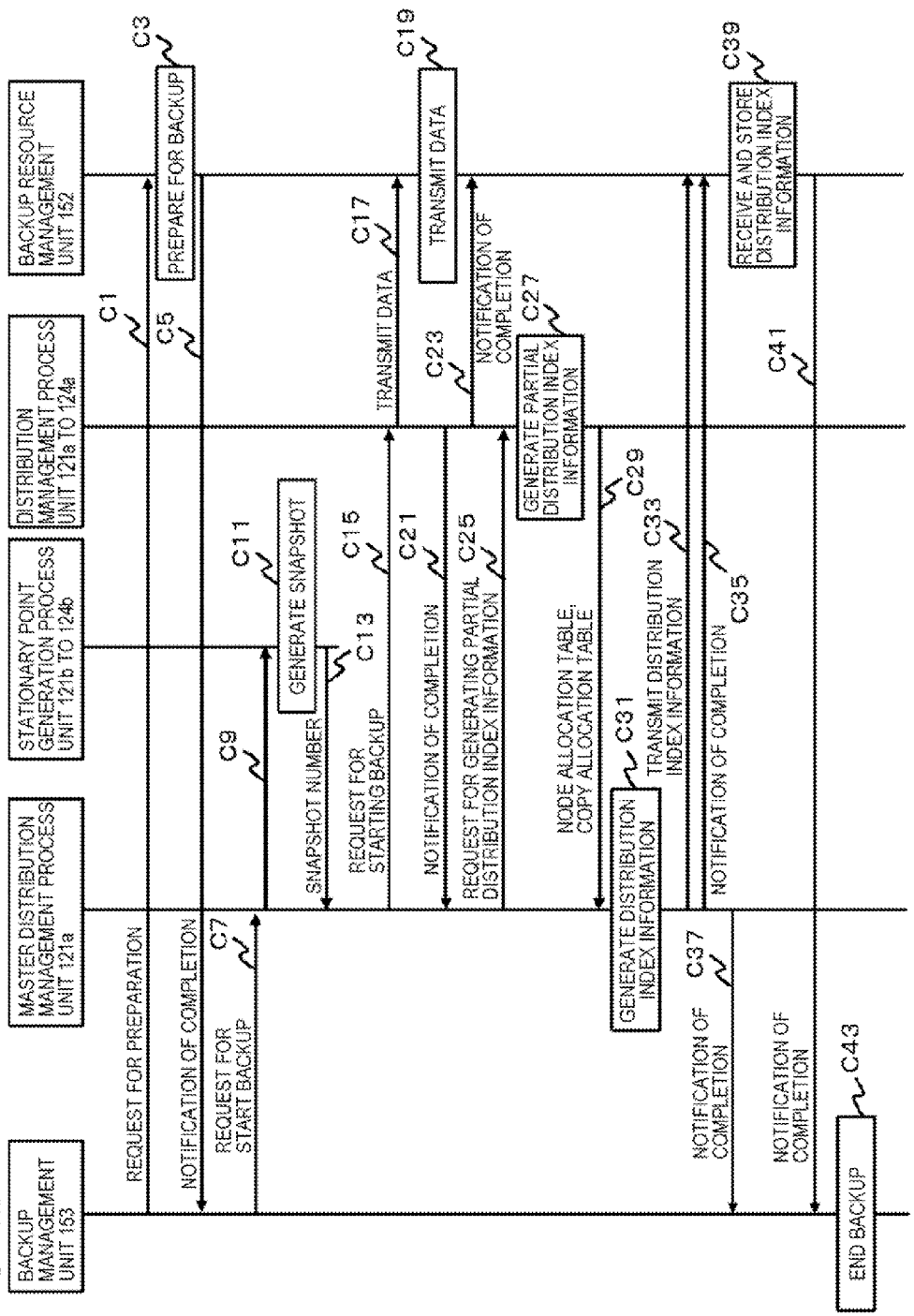
FIG. 12 is a diagram illustrating one example of a sequence diagram at the time of making a backup of a data insertion system according to the second exemplary embodiment.

In the sequence diagram of the data restoring system illustrated in FIG. 12, the backup management unit 153 requests the backup resource management unit 152 to prepare for making a backup (step C1). The preparation request contains a backup identification name, and addresses of the storage nodes 121 to 124, which are backup sources. The backup resource management unit 152 prepares for receiving the data in response to the preparation instruction containing the backup identification name and an address of the storage control 101, which is a backup source (step C3). This preparation includes generating a network receiving port, and identifying a data recording medium, for example.

After completing the preparation for the backup, the backup resource management unit 152 transmits, to the backup management unit 153, a notification indicating that the preparation is completed (step C5).

The backup management unit 153 issues an instruction for making the backup to any of the storage nodes 121 to 124. Note that, in this exemplary embodiment, it is assumed that the instruction for making the backup is issued to the storage node 121. The distribution management process unit 121a of the storage node 121 that receives the instruction becomes a master distribution management process unit 121a (step C7).

The master distribution management process unit 121a issues an instruction to generate the stationary point to all the stationary point generation process units 121b to 124b of the storage nodes 121 to 124 (step C9). The stationary point generation process units 121b to 124b each generate a snapshot image at a point logically consistent throughout the storage nodes 121 to 124, on the basis of a distribution snapshot generation algorithm (step C11).

The stationary point generation process units 121b to 124b each transmit a number of the generated snapshot image (hereinafter, referred to as a snapshot number) to the master distribution management process unit 121a (step C13).

Upon receiving all the snapshot numbers, the master distribution management process unit 121a transmits a request to start the backup, which is to transfer main data to the backup resource management unit 152, to all the distribution management process units 121a to 124a (step C15). The term "main data" described above means data that are not the copy data of main data in other nodes.

Upon receiving the request to start the backup, the distribution management process units 121a to 124a each transmit the main data to the backup resource management unit 152 (step C17). Upon receiving the main data from the distribution management process units 121a to 124a, the backup resource management unit 152 stores the received main data (step C19).

After completing transmitting the main data on all the snapshot images of the storage nodes 121 to 124, the distribution management process units 121a to 124a transmit, to the master distribution management process unit 121a, a notification of completion indicating that transmission of the main data is completed (step C21). Similarly, the distribution management process units 121a to 124a notify the backup resource management unit 152 that transmission of the main data is completed (step C23).

The master distribution management process unit 121a transmits a request for generating the partial distribution index information to the distribution management process units 121a to 124a (step C25). Each of the distribution management process units 121a to 124a generates the partial distribution index information of each of the storage nodes 121 to 124 (step C27). The distribution management process units 121a to 124a transmit the generated partial distribution index information to the master distribution management process unit 121a (step C29). The term "partial distribution index information" in this specification means the hash function program, the node allocation table, and the copy allocation table described above.

The master distribution management process unit 121a generates a piece of distribution index information on the basis of the partial distribution index information of each of the storage nodes 121 to 124 (step C31). The master distribution management process unit 121a transmits the generated distribution index information, together with the hash function program, to the backup resource management unit 152 (step C33).

After transmitting the generated distribution index information to the backup resource management unit 152, the master distribution management process unit 121a transmits, to the backup resource management unit 152, a notification of completion indicating that the backup is completed (step C35). The master distribution management process unit 121a also transmits, to the backup management unit 153, the notification of completion indicating that the backup is completed (step C37).

Upon receiving the distribution index information from the master distribution management process unit 121a, the backup resource management unit 152 stores the distribution index information (step C39). Then, the backup resource management unit 152 transmits, to the backup management unit 153, the notification of completion indicating that reception of the backup is completed (step C41).

Upon obtaining the notification of completion from the master distribution management process unit 121a and the backup resource management unit 152, the backup management unit 153 ends the backup operation (step C43).

Figure 13:
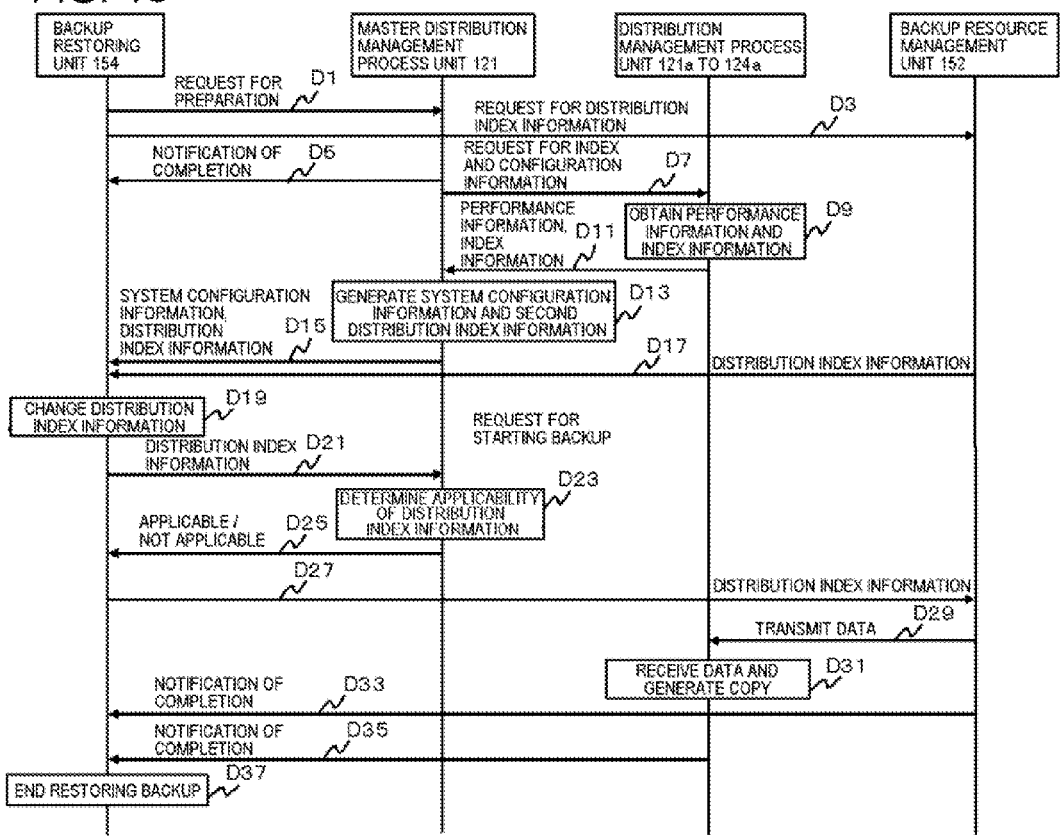
FIG. 13 is a diagram illustrating one example of a sequence diagram at the time of a data restoring operation of the data insertion system according to the second exemplary embodiment.

Next, the data restoring process of the data restoring system according to this exemplary embodiment will be described with reference to a sequence diagram in FIG. 13.

In this exemplary embodiment, as one example, it is assumed that the above-described backup data are restored so as to be in the state where the storage node 125 having a performance similar to the storage nodes 121 to 124 is inserted in the storage system 12.

The backup restoring unit 154 transmits an instruction to prepare for receiving the backup to any one of the storage nodes 121 to 124 (step D1). Here, for example, it is assumed that the backup restoring unit 159 transmits the instruction to prepare for receiving the backup to the storage node 121. The backup restoring unit 154 requests distribution index information from the backup resource management unit 152 (step D3).

Upon receiving the instruction to prepare for receiving the backup, the storage node 121 becomes a master distribution management process unit 121a. After completing preparing for receiving the backup, the master distribution management process unit 121a transmits a notification of completion of preparation for receiving the backup, which serves as a response (step D5).

The master distribution management process unit 121a requests a storage node address list, a relative performance value list of disk drives, a relative capacity value list, a node allocation table and a copy allocation table from all the distribution management process units 121a to 124a (step D7).

The distribution management process units 121a to 124a each extract the storage node address list, the relative performance value list of the disk drive, the relative capacity value list, the node allocation table and the copy allocation table. Further, the distribution management process units 121a to 124a each extract index information thereof (step D9). Note that the storage node address list, the relative performance value list of the disk drives, the relative capacity value list, the node allocation table and the copy allocation table are defined as performance information.

The distribution management process units 121a to 124a each transmit the extracted performance information and the extracted index information to the master distribution management process unit 121a (step D11). Note that the index information means data arrangement information illustrated in FIG. 3.

The master distribution management process unit 121a generates system configuration information on the basis of the obtained performance information. Further, the master distribution management process unit 121a generates distribution management information, which corresponds to second distribution index information in this case, on the basis of the obtained index information (step D13).

The master distribution management process unit 121a transmits the generated system configuration information and the second distribution index information to the backup restoring unit 154 (step D15). Further, the master distribution management process unit 121a receives distribution index information, which is transmitted from the backup resource management unit 152 and in this case corresponds to first distribution index information (step D17).

The backup restoring unit 154 newly generates distribution index information on the basis of the system configuration information and the second distribution index information received from the master distribution management process unit 121a, and the first distribution index information received from the backup resource management unit 152 (step D19).

Here, the newly generated distribution index information, which in other words corresponds to new distribution index information, is generated for example in the following manner.

In this example, in an algorithm that places a high value on a performance of parallel access to certain data, distribution of the data number is close to a ratio of storage size, and, data stored in the same storage node before backup are stored in the same storage node as much as possible.

First, a hash function h(d) and the node allocation table are extracted from partial distribution index information at the time of backup. Then, on the basis of the node allocation table, a storage node address list at the time of backup is generated. For example, it is possible to generate a storage node address list on the basis of the copy retaining node number in the node allocation table illustrated in FIG. 10.

Next, hash value ranges illustrated in FIG. 9 and FIG. 10 are changed. For example, the range of values of the hash function h(d) is divided. Here, this division is made such that a ratio of the widths of the divided ranges is equal to a ratio of the relative capacity value list of the system configuration information. Then, the node allocation table is updated so as to be equal to the ratio of the relative capacity value list.

For example, due to the fact that the storage node 125 is added, the node allocation table of the distribution index information is updated, and, the allocation ranges of the hash values each equally allocated to the storage nodes 121 to 124 before the addition of the storage node 125 are allocated equally to the storage nodes 121 to 125. Note that, as described above, the change of allocation due to the change of storage nodes 121 to 125 is also considered to be the change made because of reflecting the use tendency.

With this configuration, the backup restoring unit 154 can change the first distribution index information, and generate the new distribution index information. Further, the backup restoring unit 134 transfers the new distribution index information to the master distribution management process unit 121a (step D21).

It should be noted that change of distribution index information is not limited to that described in this exemplary embodiment. For example, as described in the first exemplary embodiment, the node number in the node allocation table may be changed in this exemplary embodiment. In this case, it is possible to emphasize the sequential access to the data.

Upon receiving the new distribution index information, the master distribution management process unit 121a determines the applicability as to whether the new distribution index information that has been changed can be stored with regards to the status of the current distribution index information, similar to the casein step B17 (step D23). If storing is applicable, the master distribution management process unit 121a transmits, to the backup restoring unit 154, a response indicating that storage is possible. On the other hand, if storing is not applicable, the master distribution management process unit 121a transmits, to the backup restoring unit 154, a response indicating that storing is not possible (step D25).

Upon receiving from the master distribution management process unit 121a the response indicating that storing is possible, the backup restoring unit 154 transmits the new distribution index information to the backup resource management unit 152 (step D27). Upon receiving the new distribution index information, the backup resource management unit 152 transmits the target data from the disk drives 151 to the storage nodes 121 to 124, which are storage destinations, on the basis of the received new distribution index information (step D29).

Upon receiving the data to be stored, the storage nodes 121 to 124 store the target data. At the same time, the distribution management process units 121a to 124a determine a copy storage node for the data on the basis of the copy allocation table, and generate a copy of the data. Then, the distribution management process units 121a to 124a transmit the generated copy of the data to the copy storage node. The storage node for storing the copy stores the main data transmitted from the backup storage 15 and the copy of the data transmitted from the other storages (step D31).

After completing transmitting all the target data to be backed up, the backup resource management unit 152 transmits a notification of completion indicating that transmission of the data to the backup restoring unit 154 is completed (step D33). Further, after completing recording all the target data to be backed up, the storage nodes 121 to 124 transmit, to the backup restoring unit 154, a notification of completion indicating that restoring of the data is completed (step D35).

Upon receiving the notifications of completion from the distribution management process units 121a to 124a and the backup resource management unit 152, the backup restoring unit 154 ends the process of restoring the data from the backup (step D37).

As described above, in the second exemplary embodiment, the data restoring system can make a backup at a stationary point by using a snapshot even in the case where the storage nodes 121 to 124 are connected with each other through a network. With this configuration, in this exemplary embodiment, it is possible to make a backup of the storage nodes connected through the network on the basis of the use tendency. Further, in this exemplary embodiment, the backup data made on the basis of the use tendency can be restored in a manner that the data are arranged on the basis of the use tendency in the storage nodes 121 to 124 connected through the network.

[Third Exemplary Embodiment]

A third exemplary embodiment has a configuration in which data use tendency information is obtained at the time of data backup in addition to the distribution index information in the second exemplary embodiment.

In the step C31 in the third exemplary embodiment, upon receiving the node allocation table, the copy allocation table and the hash function program from the distribution management process unit 121a to 124a, the master distribution management process unit 121a generates the second distribution index information. Further, the master distribution management process unit 121a collects simultaneous use frequency information for each data from the distribution management process units 121a to 124a, and generates data use frequency information.

Then, the master distribution management process unit 121a transmits the generated second distribution index information and the generated data use frequency information to the backup restoring unit 154.

Here, the simultaneous use frequency information may be, for example, a frequency pattern obtained by extracting a correlation rule on the basis of an access log on the data access in the most recent within certain period of time. More specifically, the data in the storage node 123 and the data in the storage node 124 are each obtained by dividing a large datum, and the access to the storage node 123 and the access to the storage node 124 are simultaneously performed without fail. Note that such a relation is treated as link information indicating relativity between data on the basis of the use tendency.

In this case, in the step D19, the backup restoring unit 154 changes the node allocation table of the distribution index information on the basis of the given system configuration information and the stored data use frequency information.

For example, FIG. 14 illustrates one example of the distribution index information of the storage node 123 at the time of generating the backup. In FIG. 14, the hash value ranges are associated with the copy retaining node numbers (121 to 124).

As the storage node 125 is added, the system configuration information is changed. Further, in the data use frequency information, both of the data in the storage node 123 and the data in the storage node 124 are used simultaneously, and hence, in the step D19, the node allocation table of the distribution index information is changed. More specifically, the allocation ranges of the hash values that have been each equally allocated to the storage nodes 121 and 123 are changed so as to be allocated equally to the storage nodes 121, 122 and 125.

FIG. 15 illustrates a node allocation table after the change. The storage node 123 and the storage node 124 are used simultaneously, and hence, in the data arrangement information, the storage nodes 121, 122 and 125 are equally divided while maintaining the relationship between the storage node 123 and the storage node 124.

At the time of restoring the data, new distribution index information is generated on the basis of this data arrangement information, and data restoring is performed from the backup storage 15 to the storage system 12, whereby it is possible to arrange the data on the basis of the use tendency.

As described above, in the third exemplary embodiment, the data restoring system can change the node allocation table on the basis of the data use frequency information, and can change the node allocation table so as to correspond to the system configuration information in which the storage node is changed. With this configuration, the data restoring system according to the third exemplary embodiment can restore the backup data stored in the backup storage 15 to the storage system 12 in a manner that reflects the use tendency of the data to the system configuration information.

Descriptions have been made of the exemplary embodiments of the present invention with reference to the drawings. However, these exemplary embodiments are merely exemplary forms, and it is possible to employ various configurations other than those described above.

For example, the first exemplary embodiment has been described by giving the disk drives 111 to 114 as one example of the storage areas, but this exemplary embodiment is not limited to this. For example, the storage area may be a hard disk drive, a dynamic random access memory (DRAM), a nonvolatile semiconductor memory (flash memory, magnetoresistive random access memory (MRAM), a ferroelectric random (FeRAM) and the like. Further, the storage area may be a physical medium such as a magnetic tape capable of recording data, and one or more above-described media integrated into redundant arrays of inexpensive disks (RAID) controller. Yet further, it may be possible to employ a configuration in which these media are placed outside the storage nodes, and a controller controls so as to be able to record the data into the media, and it may be possible to combine these media and/or configuration.

In the first to third exemplary embodiments, although the backup process and the data restoring process are separately performed, the present exemplary embodiments are not limited to this. For example, in the first to third exemplary embodiments, it may be possible to perform the backup process and the data restoring process at the same time.

In this case, since the backup process can be started at the same time when the data restoring process is started, it is possible to obtain another backup data. With this configuration, the backup process and the data restoring process are performed at the same time, whereby it is possible to replace the backup data.

It should be noted that it is only necessary that constituent elements in the present exemplary embodiments are configured in a manner that can realize their own functions. For example, it may be possible to employ dedicated hardware that provides a predetermined function, or a backup controller 3 or a storage system 1 to which a predetermined function is provided by a computer program. Further, it may be possible to realize the constituent elements by the predetermined function of the backup controller 3 or storage system 1 realized by the computer program, or combination of any of them, for example.

Further, it is not necessary to configure the constituent elements in the present exemplary embodiments as independent units. It may be possible to employ a configuration in which: plural constituent elements are formed as one device; one constituent element is formed by plural devices; one constituent element forms a part of other constituent element; and, part of one constituent element overlaps with part of other constituent element, for example.

Further, for the backup process and the data restoring process in the present exemplary embodiments, plural steps are described in a sequential manner. However, the described order does not necessarily limit the order in which the plural steps are performed. Therefore, at the time of performing the method according to the present exemplary embodiments, the order of the plural steps can be changed in a degree that does not adversely affect the contents thereof.

Further, the plural steps in the above-described method according to the present exemplary embodiments are not limited to be performed with different timings. Therefore, it may be possible to employ a configuration in which: during a time when one step is being performed, other step occurs; or, timing of performing one step partly or entirely overlaps with timing of performing the other step, for example.

For example, in the data restoring process, the order of request for the configuration information in the step B7, generation of the configuration information in the step B9, the system configuration information in the step B11, and, change of the distribution index information in the step B13 are not limited to the order described in the first exemplary embodiment. More specifically, it may be possible to periodically generate the system configuration information with any timing, and upon receiving a request for the configuration information, transmit the generated latest system configuration information.

Further, the storage system 1and the backup controller 3 in the present exemplary embodiments can be realized, for example, by an information processing device capable of transmitting/receiving data. Further, it may be possible to realize the storage system 1 and the backup controller 3 by hardware configured with: a general-purpose device such as a CPU, a read only memory (ROM), a random access memory (RAM) and an interface (I/F) unit; a dedicated logic circuit configured so as to be able to perform predetermined information processing; and combination thereof, for example.

The present application claims priority based on Japanese Patent Application No. 2009-083426 filed in Japan on Mar. 30, 2009, all of which disclosure is incorporated herein by reference.

The invention claimed is:

1. A data insertion system including a first storage device that stores predetermined data; a second storage device that receives the data from the first storage device; and a data control device that selects the data transmitted from the first storage device to the second storage device, the data insertion system comprising:
   a first distribution index information obtaining unit that obtains, as first distribution index information, first data arrangement information for the data stored in the first storage device, the first data arrangement information being held at a time when the data is copied from the second storage device to the first storage device and being indicative of arrangement of the data in the second storage device;
   a configuration information request unit that requests, from the second storage device, system configuration information indicating a configuration of storage areas that the second storage device has, and second distribution index information indicating second data arrangement information of the second storage device;
   a device distribution index information generation unit that receives the configuration information request, and generates the system configuration information which indicates a configuration of storage areas that the second storage device has at the time when the configuration information request is received, and the second distribution index information which indicates arrangement of the data in the second storage device at the time when the configuration information request is received; and,
   a new data arrangement information generation unit that generates new data arrangement information on the basis of the system configuration information and the second distribution index information generated by the device distribution index information generation unit, and the first distribution index information obtained by the first distribution index information obtaining unit, wherein
   the new data arrangement information generation unit stores the data stored in the first storage device into the storage areas on the basis of the generated new data arrangement information.

2. The data insertion system according to claim 1, wherein the new data arrangement information generation unit generates new data arrangement information that maintains at least a part of arrangement positions of the data arranged in the second storage device on the basis of link information indicating relativity at the time when the data are arranged in the second storage device.

3. The data insertion system according to claim 1, further comprising
   a storage applicability determination unit that determines whether it is applicable to store the data stored in the first storage device into the storage areas.

4. The data insertion system according to claim 3, wherein the storage applicability determination unit determines whether it is applicable to store the data stored in the first storage device into the storage area, on the basis of the new data arrangement information generated by the new data arrangement information generation unit, and the storage capacities of the storage areas.

5. The data insertion system according to claim 1, further comprising:
   a data receiving unit that receives data transmitted from the first storage device as the data to be stored in the storage areas, and,
   a copy allocation unit for generating redundant data concerning the data received by the data receiving unit, and storing the generated redundant data into the storage areas.

6. The data control device in the data insertion system according to claim 1, the data control device comprising:
   a first distribution index information obtaining unit that obtains, as first distribution index information, first data arrangement information concerning the data stored in the first storage device and relating to a time when the stored data are arranged in the second storage device;
   a configuration information request unit that requests, from the second storage device, system configuration information indicating a configuration of storage areas that the second storage device has, and second distribution index information indicating second data arrangement information of the second storage device;
   a second distribution index information receiving unit that receives the system configuration information and the second distribution index information each requested by the configuration information request unit; and
   a new data arrangement information generation unit that generates new data arrangement information on the basis of the system configuration information and the second distribution index information each received by the second distribution index information receiving unit, and the first distribution index information obtained by the first distribution index information obtaining unit, wherein
   the new data arrangement information generation unit stores the data stored in the first storage device into the storage areas on the basis of the generated new data arrangement information.

7. The data insertion system according to claim 1, wherein the second storage device comprises:
   a plurality of storage areas that store data;
   a device distribution index information generation unit that generates system configuration information indicating a configuration of the storage areas and second distribution index information indicating predetermined data arrangement information on the basis of the configuration of the storage areas;

a device distribution index information transmission unit that transmits the system configuration information and the second distribution index information each generated by the device distribution index information generation unit to the data control device;

a new distribution index information receiving unit that receives new data arrangement information generated by a new data arrangement information generation unit as new distribution index information; and, a storage applicability determination unit that determines whether it is applicable to store the data stored in the first storage device into the storage areas on the basis of the new distribution index information received by the new distribution index information receiving unit.

8. The data insertion system according to claim 7, wherein the new data arrangement information is information that maintains at least a part of arrangement positions of the data arranged in the second storage device, on the basis of link information indicating relativity at the time when the data are arranged in the second storage device.

9. The data insertion system according to claim 7, wherein the storage applicability determination unit determines whether it is applicable to store the data stored in the first storage device into the storage areas, on the basis of the new data arrangement information generated by the new data arrangement information generation unit, and the storage capacities of the storage areas.

10. The data insertion system according to claim 7, wherein the second storage device further comprises:

a data receiving unit that receives data transmitted from the first storage device as the data to be stored in the storage area, and, a copy allocation unit that generating redundant data concerning the data received by the data receiving unit, and storing the generated redundant data into the storage areas.

11. The data insertion device according to claim 7, wherein the second storage device further comprises:

a backup receiving unit that receives an instruction to generate a backup of the data stored in the storage area;

a data transmission output unit that generates a copy of the data stored in the storage areas upon receiving, by the backup receiving unit, the instruction to generate the backup, and transmits the generated copy to the first storage device; and, a distribution index information generation unit that generates, as the first distribution index information, data arrangement information at the time when data are arranged in the storage area, on the basis of the copy transmitted by the data transmission output unit.

12. The data insertion device according to claim 11, wherein the second storage device further comprises:

a stationary point generation unit that generates stationary point information at a certain point in time concerning the data stored in the storage area, wherein the data transmission output unit transmits the data stored in the storage areas to the first storage device on the basis of the stationary point information generated by the stationary point generation unit.

13. A data insertion method for the data insertion system according to claim 1 and including a data storage device that stores predetermined data; a storage device that receives the data from the data storage device; and, a data control device that selects the data transmitted from the data storage device to the storage device, the method comprising:

obtaining, as first distribution index information, first data arrangement information concerning the data stored in the data storage device and relating to a time when the stored data are arranged in the storage device;

requesting, from the storage device, system configuration information indicating a configuration of storage areas that the storage device has, and second distribution index information indicating second data arrangement information of the storage device;

generating the system configuration information and the second distribution index information on the basis of the configuration of the storage areas;

generating new data arrangement information on the basis of the generated system configuration information and the generated second distribution index information, and the obtained first distribution index information; and storing the data stored in the data storage device into the storage areas on the basis of the generated new data arrangement information.

14. A data control method for a data control device in the data insertion system according to claim 1 and including a data storage device that stores predetermined data; a storage device that receives the data from the data storage device; and, the data control device that selects the data transmitted from the data storage device to the storage device, the method including:

obtaining, as first distribution index information, first data arrangement information concerning the data stored in the data storage device and relating to a time when the stored data are arranged in the storage device;

requesting, from the storage device, system configuration information indicating a configuration of storage areas that the storage device has, and second distribution index information indicating the second data arrangement information of the storage device;

receiving the requested system configuration information and the requested second distribution index information generating new data arrangement information on the basis of the received system configuration information and the received second distribution index information, and the obtained first distribution index information; and storing the data stored in the data storage device are stored into the storage areas on the basis of the generated new data arrangement information.

15. A data storing method for a storage device in the data insertion system according to claim 1 and including a data storage device that stores predetermined data; the storage device that receives the data from the data storage device and includes a plurality of storage areas that store data; and, a data control device that selects the data transmitted from the data storage device to the storage device, the method including:

generating system configuration information indicating a configuration of the storage areas and second distribution index information indicating predetermined data arrangement information on the basis of the configuration of the storage areas;

transmitting the generated system configuration information and the generated second distribution index information to the data control device;

receiving new data arrangement information as new distribution index information; and, determining whether or not it is applicable to store the data stored in the data storage device into the storage areas on the basis of the received new distribution index information.

16. A storing medium for storing a data control program that causes a data control device in the data insertion system according to claim 1 and including a data storage device that stores predetermined data; the storage device that receives the data from the data storage device; and, the data control device that selects the data transmitted from the data storage device to the storage device, to execute data processing, the data processing including:
- a first distribution index information obtaining procedure of obtaining, as first distribution index information, first data arrangement information concerning the data stored in the data storage device and relating to a time when the stored data are arranged in the storage device;
- a configuration information request procedure of requesting, from the storage device, system configuration information indicating a configuration of storage areas that the storage device has, and second distribution index information indicating the second data arrangement information of the storage device;
- a second distribution information receiving procedure of receiving the system configuration information and the second distribution index information requested in the configuration information request procedure; and
- a new data arrangement information generation procedure of generating new data arrangement information on the basis of the system configuration information and the second distribution index information received in the second distribution index information receiving procedure, and the first distribution index information obtained in the first distribution index information obtaining procedure, wherein, in the new data arrangement information generation procedure, the data stored in the data storage device are stored into the storage areas on the basis of the generated new data arrangement information.

17. A storing medium for storing a data storage program that causes a storage device in the data insertion system according to claim 1 and including a data storage device that stores predetermined data; the storage device that has a plurality of storage areas for storing data and receives the data from the data storage device; and, a data control device that selects the data transmitted from the data storage device to the storage device, to execute data processing, the data processing including:
- a device distribution index information generation procedure of generating system configuration information indicating a configuration of the storage areas and second distribution index information indicating predetermined data arrangement information on the basis of the configuration of the storage areas;
- a device distribution index information transmission procedure of transmitting the system configuration information and the second distribution index information generated in the device distribution index information generation procedure to the data control device;
- a new distribution index information receiving procedure of receiving new data arrangement information generated in a new data arrangement information generation procedure as new distribution index information; and,
- a storage applicability determination procedure of determining whether or not it is applicable to store the data stored in the data storage device into the storage areas on the basis of the new distribution index information received in the new distribution index information receiving procedure.

* * * * *